July 13, 1965 G. T. THURMAN 3,194,361
PARTITION STRUCTURES
Filed June 29, 1960 5 Sheets-Sheet 1

INVENTOR.
GEORGE T. THURMAN
BY Hudson, Coughton,
Williams, David & Hoffmann
ATTORNEYS July 13, 1965 G. T. THURMAN 3,194,361
PARTITION STRUCTURES
Filed June 29, 1960 5 Sheets-Sheet 2
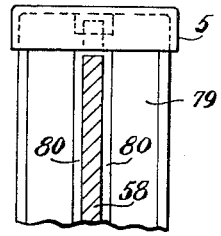
FIG. 11
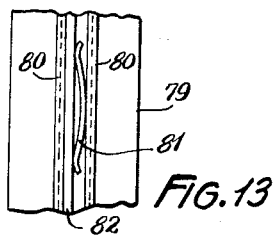
FIG. 13
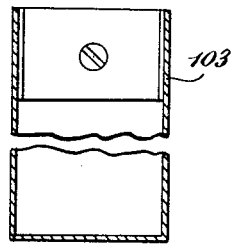
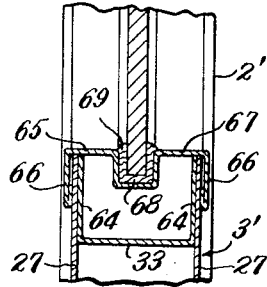
FIG. 4
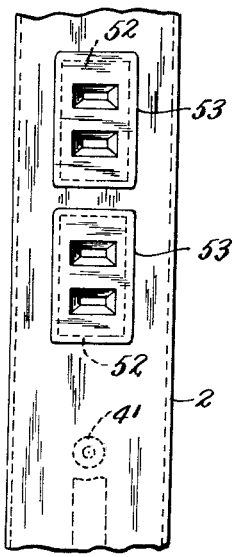
FIG. 8
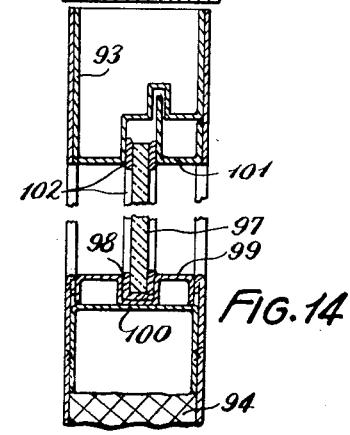
FIG. 14
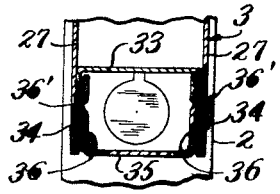
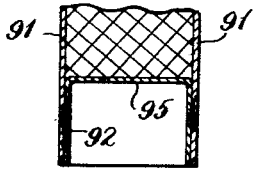
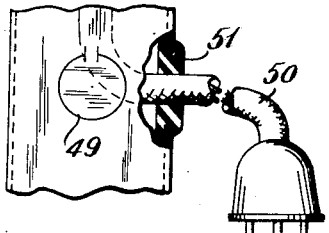
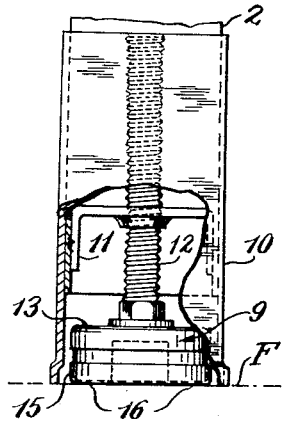
FIG. 2
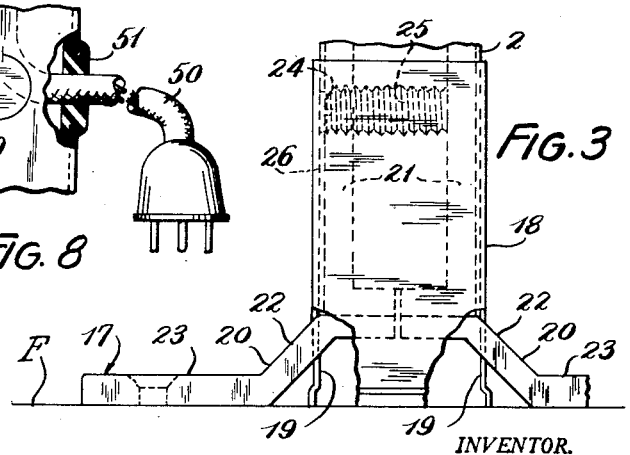
FIG. 3
INVENTOR.
GEORGE T. THURMAN
BY Hudson, Boughton,
Williams, David & Hoffmann
ATTORNEYS

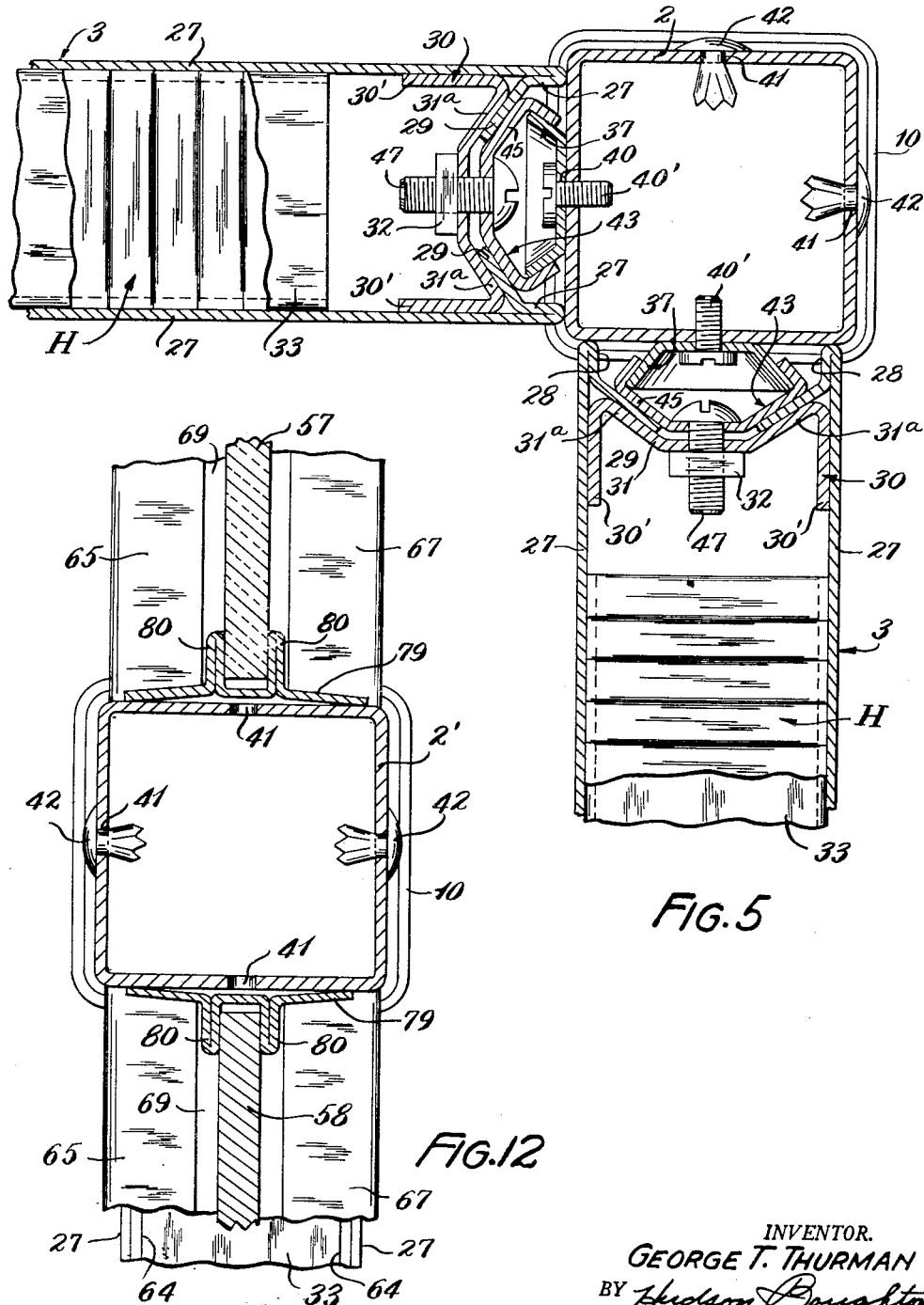

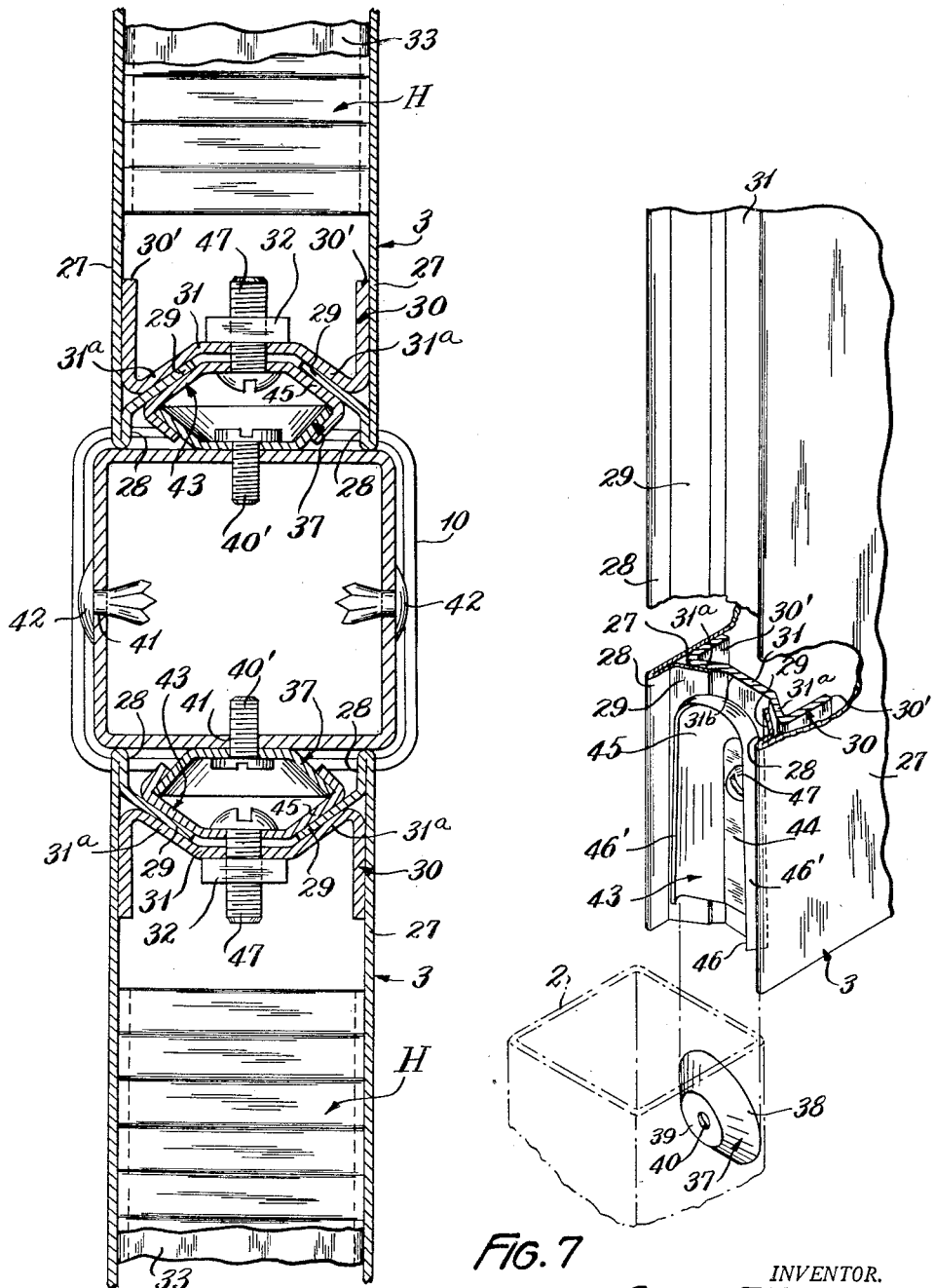

July 13, 1965  G. T. THURMAN  3,194,361
PARTITION STRUCTURES
Filed June 29, 1960  5 Sheets-Sheet 5

INVENTOR
GEORGE T. THURMAN
BY Hudson, Boughton,
Williams, David & Hoffmann
ATTORNEYS 3,194,361
PARTITION STRUCTURES
George T. Thurman, Wickliffe, Ohio, assignor to The Mills Company, Cleveland, Ohio, a corporation of Ohio
Filed June 29, 1960, Ser. No. 39,607
2 Claims. (Cl. 189—34)

The present invention relates to partition or space divider structures and particularly to partition or space divider structures built up of prefabricated parts which may be readily assembled and disassembled relative to one another.

One of the principal objects of the present invention is the provision of a novel and improved partition structural member having a plurality of mounting areas spaced angularly about an axis parallel to the height dimension of the member and a locking element detachably mounted at one or more of said areas and adapted to engage a locking element on another structural member.

Another of the principal objects of the present invention is the provision of a novel and improved partition or space divider structure built up of prefabricated structural members having cooperating locking elements at least one of which is detachably connected to its member so as to permit connection of the members to one another in various arrangements.

A further object of the invention is the provision of a novel and improved partition or space divider structure of the character referred to built up to have two or more angularly related sides so as to be self-sustaining or substantially self-sustaining whereby it may be readily moved about to desired locations.

The invention resides in certain constructions, combinations and arrangements of parts and further objects and advantages will be apparent from the following description taken in conjunction with the accompanying drawings forming a part of this specification in which similar reference characters designate corresponding parts and in which, FIG. 1 is a view in perspective showing a space divider having corners and embodying the invention;

FIG. 2 is a view taken along the line 2—2 of FIG. 1 with parts broken away illustrating an attachment for adjustably supporting a post above the level of the floor;

FIG. 3 is a view taken along the line 3—3 of FIG. 1 showing an attachment for a post associated with a swinging door;

FIG. 4 is a view taken along the line 4—4 of FIG. 1 showing a portion of one of the panels;

FIG. 5 is a view taken along the line 5—5 of FIG. 1 illustrating the locking elements between a pair of panels and a corner post;

FIG. 6 is a view taken along the line 6—6 of FIG. 1 illustrating the locking elements between a pair of in-line panels and an intermediate post;

FIG. 7 is a view in perspective showing cooperating locking elements for connecting a panel to a post;

FIG. 8 is an enlarged fragmentary view in front elevation showing a post and electrical components associated with the post;

FIG. 11 is a view taken along the line 11—11 of FIG. 9 with parts broken away illustrating a panel and a post supporting an insert;

FIG. 12 is a view taken along the line 12—12 of FIG. 9 illustrating a pair of inserts connected to an intermediate post;

FIG. 13 is a view showing a post supporting an insert of smaller thickness than the insert of FIG. 11; and FIG. 14 is a view taken along the line 14—14 of FIG. 9 showing the door of FIG. 9.

Figure 1:
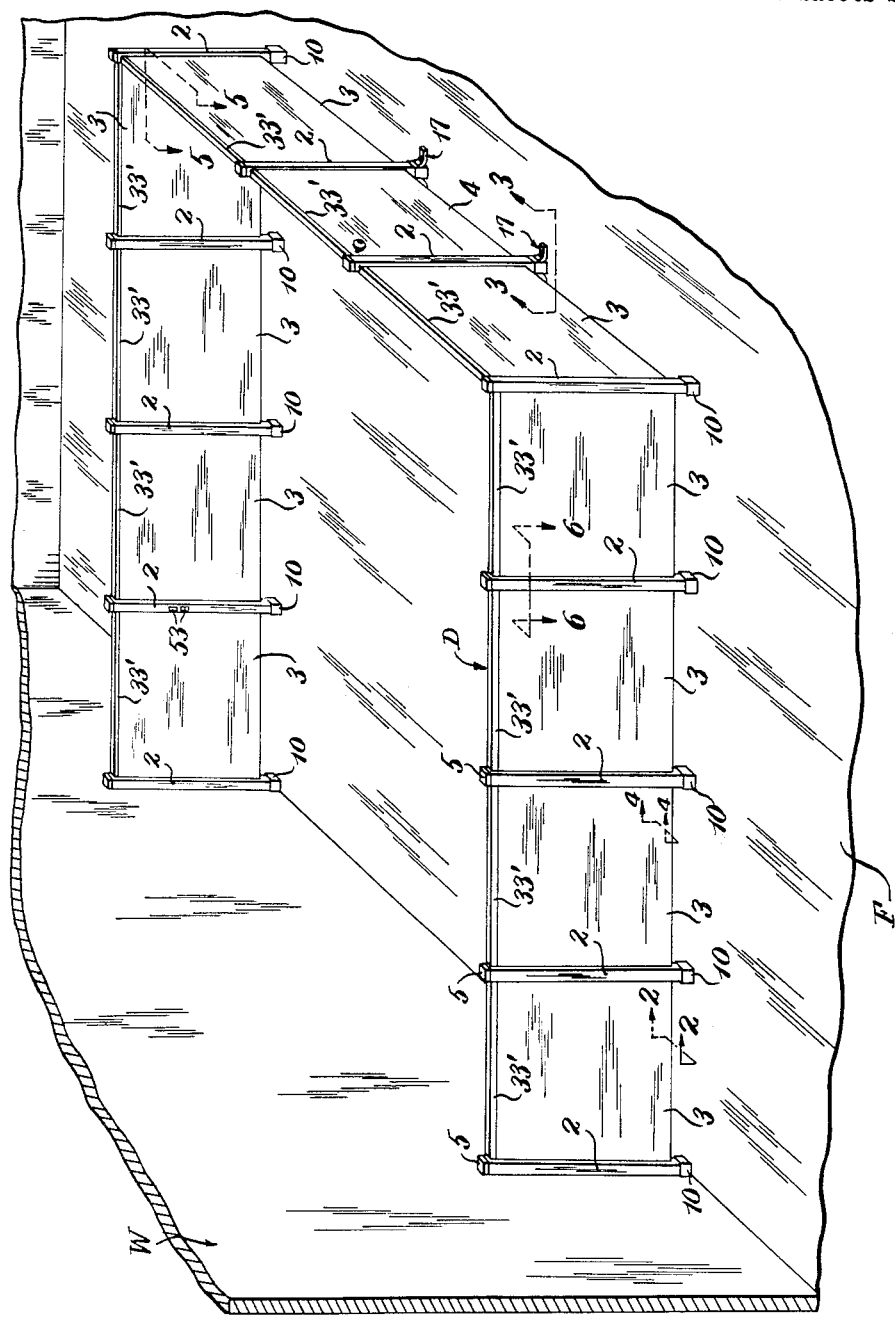

While particular space divider and/or partition arrangements are shown in the drawings and hereinafter described, it is to be understood that the invention is not limited to the constructions and arrangements or members shown, but that it can be embodied in many different space divider and partition arrangements. The invention is particularly applicable to self-sustaining or substantially self-sustaining space divider and/or partitions formed of light weight structural members and intended for use primarily where temporary enclosures are desired.

In general, a space divider or partition embodying the invention is built up of prefabricated structural members comprising posts and panels connected to one another by interfitting locking elements mounted on the posts and panels. The posts preferably have a plurality of mounting areas spaced about their longitudinal axis at each of which areas a locking element may be detachably mounted so that one or a plurality of panels may be connected to the posts at various selected angular positions.

Dividers or partitions may be employed in any area such as a room, lobby or the like which is to be subdivided or parts of which are to be enclosed. A space divider or partition may be formed having panels connected to one or more posts at right angles to each other so that the structure is self-sustaining or substantially self-sustaining in which event it may be readily disassembled and reassembled and/or moved about as desired. The posts and panels may also be assembled to form a space divider or partition of generally planar or in-line configuration in which event the posts are preferably attached to a supporting surface such as a floor or to a wall.

Referring to the drawings, FIG. 1 shows as one embodiment of the invention a space divider, designated generally by the reference character D, formed of prefabricated structural members consisting of horizontally spaced posts 2 vertically supported on a floor F, partition members or panels 3 and a door 4. The heights of the posts and the panels and the widths of the panels may be selected as desired. The posts shown do not extend to a ceiling and their upper ends are closed by detachable caps 5. The posts, however, may extend to a ceiling and be attached thereto but such is not the preferred arrangement.

The divider D has a generally U-shaped configuration with three angularly related sides forming two corners and is shown abutting a wall W which closes the fourth side of the divider. A swinging door 4 is mounted by one of the posts to permit entry to and exit from the enclosed area. The divider need not be attached to the wall W but the posts between which the door is located are preferably secured to the floor F.

The posts 2 are preferably of light weight, one piece tubular construction and may be formed from a metal such as aluminum or steel. Preferably, the posts have cross sections transverse to their lengths which are of square configuration.

Leveling attachments designated generally by the numeral 9 are connected to the lower ends of the posts to level the top of the divider above the floor. As best shown in FIG. 2, the leveling attachments 9 are secured to the posts within the hollow thereof adjacent to their lower ends. A protective and decorative plastic or like cover 10 of tubular formation telescopically surrounds the lower portion of each of the posts 2 and normally engages the floor for concealing and protecting the attachment 9 connected to the post.

Each of the attachments 9 is mounted to its associated post by a U-shaped bracket 11 secured to opposing inner surfaces of the post such as by welding. The bracket 11 includes a threaded opening which receives a threaded stud 12 having attached thereto an enlarged foot 13 including a recess in which is located the head of stud 12. The stud 12 is fixed to the foot 13 by a nut. The stud and enlarged head fixed thereto may be rotated by a suitable tool such as a wrench for raising or lowering the post to effect leveling of the divider. If desired, a floor cup 15 may be slipped over the bottom of the foot 13. The cup 15 includes spaced dimples 16 which effect a gripping action on the floor.

When doors, such as the door 4 is utilized, a different type of attachment is employed to support the posts between which the door is mounted. This attachment is designated generally by the numeral 17 and is shown in FIG. 3 as being surrounded in part by a protective and decorative cover 18 which is of tubular construction fitting over the lower portion of the post and engaging the floor. The cover 18 is formed with notches extending upwardly from its lower edge at diametrically opposed areas to accommodate outwardly extending portions of the attachment 17.

The attachment 17 is of two-part construction including similar parts 20 each having a vertically extending portion 21 connected to an intermediate inclined portion 22 which terminates in a horizontal base portion 23. The attachment is positioned with the portions 21 projecting upwardly within the hollow of the post, with the portions 22 extending downwardly away from each other through the notches 19, and with the base portions 23 engaging the floor. The portion 21 of the left hand one of the parts 20 has a threaded opening 24 for receiving a setscrew 25 which is accessible through a vertically elongated slot 26 in the post. The screw 25 is rotatable into engagement with the portion 21 of the right hand one of the parts 20 so as to spread the portions 21 into tight engagement with inner surfaces of the post. The attachment 17 may be secured to the floor by suitable screws which extend through openings of the base portions 23. The described arrangement permits leveling of the divider and strengthens and stabilizes the divider at areas which include swinging doors.

The construction of the panels 3 is best shown in FIGS. 4 through 7. These panels are of light weight construction each including a pair of horizontally spaced, vertically extending parallel walls 27 constructed of aluminum, steel or other light and sturdy material. As best shown in FIGS. 5, 6 and 7 the walls 27 have vertically extending edge portions folded back so that parts 28 thereof engage the inner surfaces of the walls and parts 29 project from the parts 28 inwardly of the walls 27 toward each other at angles of approximately sixty degrees with the walls.

A vertically extending channel member 30 is positioned between the walls 27 at each vertical edge of the panel and has spaced legs 30' engaging the inner surfaces of the walls 27 and a base 31 connecting the legs 30'. The base 31 has end sections 31a engaging the inwardly extending parts 29 of the walls 27 and a central section 31b including an opening aligned with a threaded opening of a member 32 (FIG. 6) secured as by welding to the section 31b. Each of the members 30 mounts one or more locking elements at the vertically extending edges of the panels which cooperate with locking elements mounted on the posts.

As shown in FIG. 4 a horizontally extending channel member 33 is positioned between the walls 27 at the lower edges thereof and has a base from which depends side flanges 34 secured as by adhesive to the inner surfaces of the walls 27. The member 33 and a similar member at the top of the panel operate to assist in supporting the walls 27 in vertical spaced relation. The upper end of the panel is closed by a horizontally extending snap-on channel-shaped cap member 33' shown in FIG. 1, and the lower end of the panel is closed by a horizontally extending snap-in channel member 35 having side flanges 36 with outwardly extending projections 36' engaging the flanges 34 of the member 33. The lower member 33 and the similar upper member preferably do not extend the full length of the panel so that they may be secured to the panel prior to installation of the members 30.

As stated previously, cooperating locking elements are mounted on the posts and panels to permit detachable connection of the posts and the panels to one another. The post locking elements 37 are best shown in FIGS. 5, 6 and 7 and are preferably detachably mounted on the post but may be permanently mounted on the post if desired. Each of the elements 37 is preferably formed of spring steel and is generally saucer shaped with an outwardly flared frusto-conical or annular wall 38 which extends from a flat base 39 engaging the outer surface of the post 2. The base 39 of the element 37 includes an opening 40 through which extends a securing element such as a screw 40' into a threaded opening 41 of the post.

In the embodiment shown each side of the post forms a mounting area and includes one or more threaded openings 41 to permit mounting of one or more of the elements 37. The angular spacing of the openings 41 about the axis of the post allows the connection of panels to a post at right angles to each other to form corners or in alignment with each other. As previously stated, each side of the posts preferably has a plurality of vertically spaced openings 41 so that a plurality of elements 37 may be mounted at each post side. Decorative plastic plugs 42 may extend through the openings 41 in the posts when such openings are not being employed to secure members 37 to the post.

The panel mounted locking elements 43 which cooperate with the post mounted elements 37 may be detachably or permanently carried by the panels 3. The elements 43 are shown as detachably mounted on the channel members 30 and may be formed of spring steel to include a flat base 44 with an outwardly projecting side wall 45 which extends around the base 44 at its sides and upper end and which is open at its lower end to permit reception of the element 37. The side wall 45 terminates in an inwardly directed flange or lip 46 which is adapted to engage the annular wall 38 of the element 37 when the element 37 is positioned within the element 43. The flange 46 includes opposed side portions 46' which converge toward each other at the upper curved part of the wall 45. The element 37 provides an outwardly facing dove-tail shaped or undercut aperture or channel having its upper end closed and its lower end open, and the arrangement is such that the elements 37 and 43 may be positioned in tight wedged engagement.

The element 43 is mounted by means of a screw 47 which extends through an opening of the base 44 and through the aligned openings of the section 31b of the channel member and of the member 32. It is observed with reference to FIG. 6 that the side wall 45 of the element 43 engages the inwardly extending parts 29 of the walls 27 when the element 43 is attached to the member 30 so that the member 30 is drawn up tightly against the parts 29 and is firmly held in position in this manner. As a result, the member 30 need not be secured to the walls 27. Any desired number of locking elements may be utilized with each post and panel assembly. For example, a panel may carry two vertically spaced locking elements 43 at each end thereof to cooperate with a pair of vertically spaced elements 37 mounted on each of a pair of posts between which the panel is located.

As shown in FIG. 6 the vertically extending edges of the walls 27 at the fold back area project beyond the element 43 and engage a side of the associated post when the post and panel are attached. As a result, the posts and panels form a substantially continuous wall which conceals the locking elements from view. The elements 37 and 43 are engageable and releasable in response to relative movement between the posts and panels in directions generally parallel to the length dimensions of the posts or to the height dimension of the partition. As an example, the locking elements are engaged by moving the panel shown in FIG. 7 downwardly relative to the post. The panels and posts may be disconnected by lifting the panels to release the locking elements. The locking elements when engaged prevent relative movement between the connected post and panels in all horizontal directions.

The locking elements are preferably positioned on the posts and panels so that when the posts and panels are attached the panels are above the level of the floor. This facilitates lifting of the panels to release the locking elements.

As shown in FIG. 8, one or more of the posts may have associated therewith components of electrical circuits for permitting electrical connections to be made to the partition. For this purpose, the post may be formed with a weakened section defining a knockout or cutout 49 which when removed from the post provides an opening for receiving a cord 50 which may extend into the hollow of the post through a grommet 51 surrounding the exposed opening. The knockout 49 is illustrated as being of circular configuration and knockouts or cutouts 52 of rectangular configuration may also be provided to provide rectangular openings for receiving electrical outlet members 53 to which conductors within the cord 50 may be connected within the hollow of the post.

A panel is assembled by positioning the bottom member 33 and its similar top member and a honeycomb filler H of suitable size between the walls 27 and securing such members to the inner surfaces of the walls 27 preferably by the use of a suitable adhesive. The honeycomb material may be made either of suitable metal or paper. A pair of the members 30 are then positioned between the walls 27 and a pair of the members 43 are secured to the members 30 by passing screws 47 through openings of the members 30 and of the members 32 secured to the members 30. If desired the panels may be filled with a suitable packing or filler material other than the preferred honeycomb material H.

Figure 9:
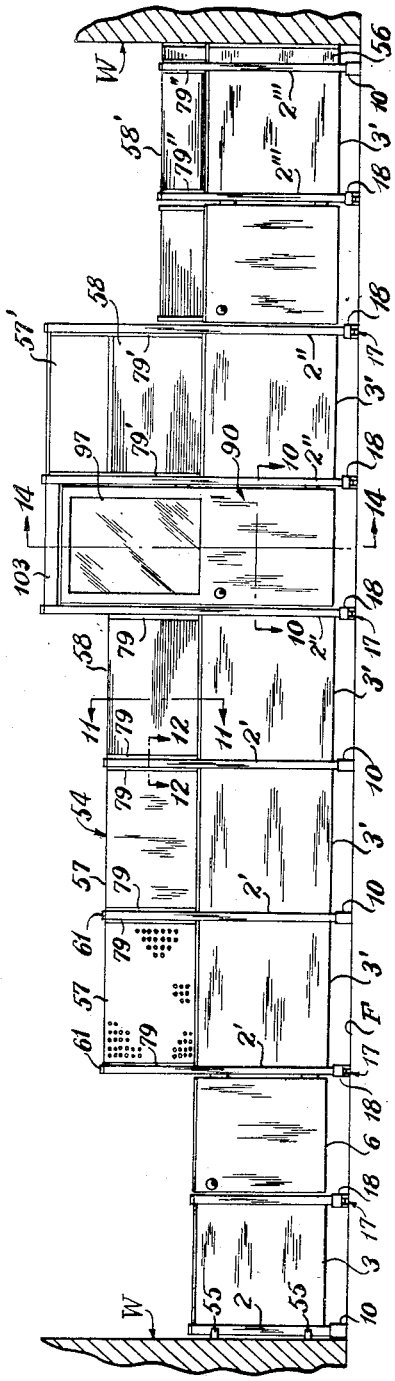
FIG. 9 is a view in front elevation of an in-line partition connected between walls and embodying the invention.

In FIG. 9, there is illustrated another embodiment of the invention wherein a partition represented generally by the numeral 54 is formed of posts 2, 2′, 2″, and 2‴ and panels 3 and 3′ connected to one another by the previously described locking elements. The posts 2, 2′, 2″ and 2‴ and panels 3 and 3′ are connected to form a partition of planar or in-line configuration extending between walls W. The posts 2′, 2″ and 2‴ are observed to have different length dimensions than the posts 2 previously described, and the panels 3′ are arranged to support inserts at their upper edges as will presently appear.

Since the partition 54 is formed of in-line panels, it is ordinarily not self-sustaining and is shown secured to the walls W. The left end post in FIG. 9 may be secured to the adjacent wall by means of members 55 connected to the wall and having horizontally spaced flanges between which the end post 2 is positioned. When the spacing between the end post and its adjacent wall exceeds a certain distance, such as two inches, a panel section 56 constructed similar to one of the panels 3 is positioned between the end post 2 and the adjacent wall for connecting the post to the wall.

Structures embodying the invention may include inserts or supplemental panels above the main panels for decorative or other purposes. These supplemental panels may be formed of any suitable material. For purposes of illustration, the partition 54 includes decorative metallic inserts 57 and 57′, and glass inserts 58 and 58′ supported between adjacent posts above the panels 3′.

The upper channel member 33, which, as previously stated, is similar in construction to the lower channel member 33 of FIG. 4, is shown in FIG. 11 and includes spaced flanges 64 secured to the inner surfaces of the walls 27 as by adhesive. A channel-shaped cap member 65 is frictionally fit over the top of the panel and has side flanges 66 adjacent the outer surfaces of the walls 27 and a base 67 extending across the upper edges of the walls 27. The base 67 is formed with a slot 68 which receives a lower horizontally extending edge of the insert 58. Aside from the channel shaped cap members 33′ and 65 of the panels 3 and 3′, respectively, the panels are alike. Because the insert 58 is glass, a grooved plastic strip 69 is preferably positioned within the slot 68 and the lower edge of the glass insert 58 is positioned within the groove of the strip 69.

As shown in FIG. 12, the posts 2′, 2″ and 2‴ which assist in supporting the inserts 57 and 57′ and 58 and 58′ have attached thereto members 79, 79′, and 79″ which have vertically extending flanges 80 spaced to receive therebetween vertically extending edges of the inserts. A spring clip 81 may be positioned in the space between the flanges 80 as shown in FIG. 13 to engage an insert 82 which has a thickness dimension less than the space between the flanges 80. The members 79, 79′ and 79″ are alike except for their length dimension. The parts of the members 79, 79′ and 79″ outwardly of the flanges 80 are cut away adjacent to the lower end of the members leaving the flanges 80 and the connecting web therebetween projecting downwardly, and the members are attached to the posts by inserting the downwardly projecting end into the channel. The web section of the members 79, 79′ and 79″ between the flanges 80 is extended upwardly above the upper end of the members and the upper ends of the members are connected to these respective posts by inserting these projections in suitable apertures adjacent to the upper end of the posts and crimping or bending them over.

Figure 10:
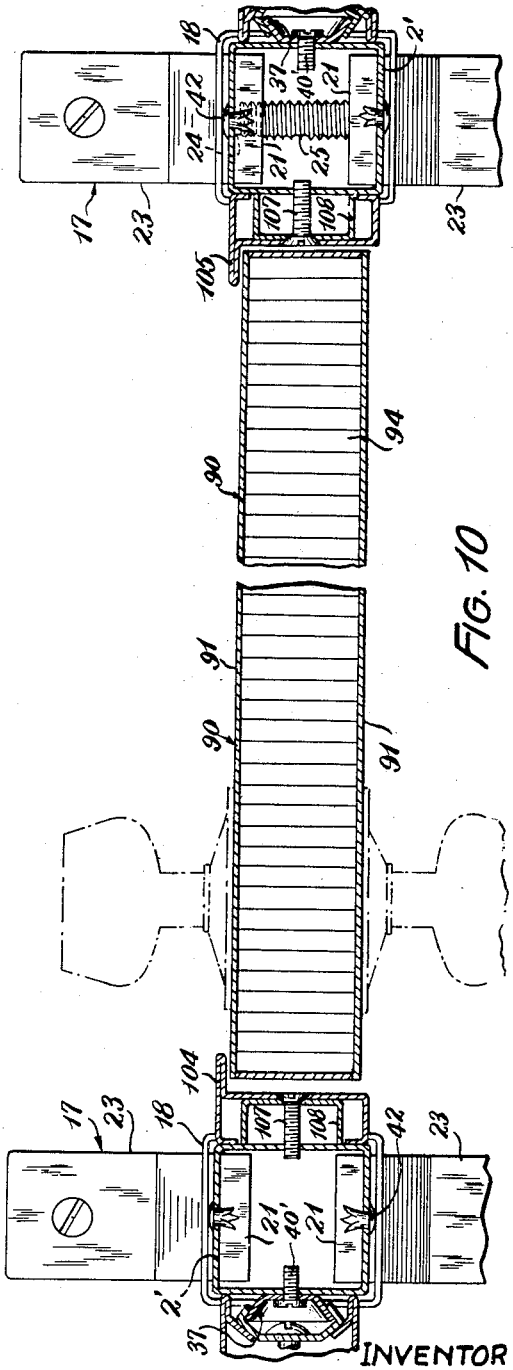
FIG. 10 is a sectional view taken along the line 10—10 of FIG. 9 illustrating a door construction.

The partition 54 includes a swinging door 90 which, as shown in FIGS. 10 and 14, is of panel construction including a pair of spaced walls 91. The door 90 may be formed of any suitable material and is preferably closed along its vertically extending edges. The horizontally extending lower and upper ends of the door are closed by channel members 92 and 93, respectively, and a honeycomb type or other suitable packing member 94 may be positioned between the walls 91. The packing 94 is supported on the base 95 of the channel member 92.

The door structure includes an insert 97 formed of a suitable material such as glass. The insert 97 has a lower edge which is positioned within a horizontally extending groove of a plastic strip 98 located within a horizontally extending slot of a molding strip 99. The molding strip 99 is supported upon the base of the channel member 100 extending across the door structure between the walls 71 of the door structure to which walls it is fixed as by welding. The vertical edges of the panel 97 are retained in vertically extending molding strips like the molding strip 99 except that the groove or channel in at least one of them is as deep as the total projection of the glass in both so as to permit the glass to be inserted and then centered in the opening. These vertical molding strips may be fixedly secured as by welding to the panels 91. The upper horizontally extending edge of the insert 97 is similarly positioned within a groove formed by an offset in the base of the channel member 93 forming the upper portion of the door structure and a removable stop 101. The groove at the top of the insert 97 is deep enough to allow the insert to be inserted and then dropped into the channel in the molding strip 99. After the insert is properly positioned suitable molding material 102 is applied. The upper ends of the pair of the posts 2″, between which the door 90 is positioned are connected by a header 103.

As shown in FIG. 10, the posts 2″ between which the door 90 is located have secured thereto respectively a strike jamb 104 and a hinge jamb 105 with the door swingably mounted by the jamb 105 by hinges attached thereto and to the door. Both the jambs are attached to the posts 2″ by means of metal screws 107 projecting through back up channel 108 and threaded into posts 2′, 2″, and 2‴.

Although the invention has been described with reference to certain specific embodiments thereof, numerous modifications are possible and it is desired to cover all modifications falling within the spirit and scope of the appended claims.

Having described my invention, I claim:

1. In a partition of the character described, at least two vertical post members, a panel member between said post members, said panel member comprising two spaced vertically postiioned sheet-like wall members each having their opposite vertical edges bent inwardly and towards each other to form channels in the vertical ends of said panel member and to provide a pair of spaced vertical flanges along said vertical end of said panel member adjacent to said post members, vertical frame members between said wall members and behind said inwardly bent edges of said wall members, pairs of cooperating locking elements, means mounting one element of each of said pairs of cooperating locking elements in one of said channels in said vertical ends of said panel member and clamping said inwardly bent edges of said wall members between said locking elements and said vertical frame member adjacent thereto, means mounting the cooperating elements of said pairs of said locking elements on said posts adjacent thereto, one of said locking elements of each of said pairs of cooperating locking elements having an outwardly facing undercut channel with an arcuate-shaped closed end and an open end and being engageable and releasable with its cooperating locking element which is saucer-shaped in response to movement of said panel member in downwardly and upwardly directions respectively, said closed ends of said channels in said locking elements serving to limit movement of said panel member in said downwardly direction and to engage said saucer-shaped cooperating locking elements to hold said members fixedly together with said vertical flanges on the ends of said panel member in engagement with said post members adjacent thereto.

2. In a partition of the character described, at least two vertical post members, a panel member between said post members, said panel member comprising two spaced vertically positioned sheet-like wall members each having vertical edges, vertical frame members between said wall members and spaced inward of said vertical edges defining channels, pairs of cooperating locking elements, means mounting one element of each of said pairs of cooperating locking elements on said vertical frame members and disposed in said channels, means mounting the cooperating elements of said pairs of said locking elements on said posts adjacent thereto, one of said locking elements of each of said pairs of cooperating locking elements having an outwardly facing undercut channel with an arcuate-shaped closed end and an open end and being engageable and releasable with its cooperating locking element which is saucer-shaped in response to movement of said panel member in downwardly and upwardly directions respectively, said cooperating ends of said channels in said locking elements serving to limit movement of said panel member in said downwardly direction and to engage said saucer-shaped cooperating locking elements to hold said panel member fixedly together in engagement with said post members adjacent thereto.

References Cited by the Examiner

UNITED STATES PATENTS

| 925,524 | 6/09 | Steinmetz | 248—224 |
| 1,544,007 | 2/25 | Hughes | 189—34 |
| 2,430,961 | 11/47 | Sprunger | 20—92.4 |
| 2,763,342 | 9/56 | French | 189—42 |
| 2,793,407 | 5/57 | Johnston | 20—92.4 |
| 2,915,151 | 12/59 | Kekenak | 189—34 |

FOREIGN PATENTS 532,177  8/55  Italy.

RICHARD W. COOKE, Jr., *Primary Examiner.*

CORNELIUS D. ANGEL, JOEL REZNEK, JACOB L. NACKENOFF, *Examiners.*